US008748366B2

(12) United States Patent
Mrzena et al.

(10) Patent No.: US 8,748,366 B2
(45) Date of Patent: Jun. 10, 2014

(54) PROCESS FOR THE PREPARATION OF A SPRAY POWDER COMPRISING ONE OR MORE GLYCINE-N,N-DIACETIC ACID DERIVATIVES AND USE OF THE SPRAY POWDER FOR PRODUCING COMPRESSION AGGLOMERATES

(75) Inventors: Frank Mrzena, Mutterstadt (DE); Michael Schoenherr, Frankenthal (DE); Robert Heinz, Ludwigshafen (DE); Thomas Heidenfelder, Hirschberg (DE)

(73) Assignee: BASF SE, Ludwigshafen (DE)

(*) Notice: Subject to any disclaimer, the term of this patent is extended or adjusted under 35 U.S.C. 154(b) by 65 days.

(21) Appl. No.: 13/321,713

(22) PCT Filed: May 19, 2010

(86) PCT No.: PCT/EP2010/056855

§ 371 (c)(1),
(2), (4) Date: Nov. 21, 2011

(87) PCT Pub. No.: WO2010/133617

PCT Pub. Date: Nov. 25, 2010

(65) Prior Publication Data

US 2012/0071381 A1 Mar. 22, 2012

Related U.S. Application Data

(60) Provisional application No. 61/253,911, filed on Oct. 22, 2009.

(30) Foreign Application Priority Data

May 20, 2009 (EP) .................................... 09160717

(51) Int. Cl.

| | |
|---|---|
| ***C11D 11/02*** | (2006.01) |
| ***C11D 3/33*** | (2006.01) |
| ***C11D 7/32*** | (2006.01) |
| ***B29B 9/00*** | (2006.01) |

(52) U.S. Cl.
USPC ........... 510/452; 510/443; 510/480; 510/513; 264/12

(58) Field of Classification Search
USPC ..................... 510/452, 443, 513, 480; 264/12
See application file for complete search history.

(56) References Cited

U.S. PATENT DOCUMENTS

| | | | | |
|---|---|---|---|---|
| 3,066,611 | A * | 12/1962 | Schwartmann et al. | 417/413.1 |
| 4,003,841 | A * | 1/1977 | Hachmann et al. | 510/312 |
| 5,518,180 | A * | 5/1996 | Svendsen | 239/224 |
| 5,981,798 | A | 11/1999 | Schonherr et al. | |
| 5,994,290 | A | 11/1999 | Potthoff-Karl et al. | |
| 5,998,356 | A * | 12/1999 | Alam et al. | 510/443 |
| 7,442,679 | B2 * | 10/2008 | Stolte et al. | 510/445 |
| 2003/0109397 | A1 * | 6/2003 | Aouad et al. | 510/267 |
| 2003/0124193 | A1 * | 7/2003 | Snyder et al. | 424/489 |
| 2003/0203832 | A1 * | 10/2003 | Boucher et al. | 510/443 |
| 2005/0215460 | A1 * | 9/2005 | Borchers et al. | 510/447 |
| 2008/0045430 | A1 | 2/2008 | Witteler et al. | |
| 2010/0187724 | A1 | 7/2010 | Heinz et al. | |
| 2011/0257431 | A1 | 10/2011 | Baumann et al. | |

FOREIGN PATENT DOCUMENTS

| | | |
|---|---|---|
| DE | 43 19 935 | 12/1994 |
| DE | 195 43 162 | 5/1997 |
| DE | 101 23 621 | 11/2002 |
| EP | 0 845 456 | 6/1998 |
| EP | 2 158 922 | 3/2010 |
| WO | 2006 002954 | 1/2006 |
| WO | WO 2009/103822 A1 * | 8/2009 |

OTHER PUBLICATIONS

International Search Report issued on Aug. 27, 2010 in PCT/EP10/056855 filed on May 19, 2010.
U.S. Appl. No. 13/318,513, filed Nov. 2, 2011, Mrzena, et al.
U.S. Appl. No. 13/242,540, filed Sep. 23, 2011, Blei, et al.
U.S. Appl. No. 13/430,105, filed Mar. 26, 2012, Baumann, et al.

* cited by examiner

*Primary Examiner* — Lorna M Douyon
(74) *Attorney, Agent, or Firm* — Oblon, Spivak, McClelland, Maier & Neustadt, L.L.P.

(57) ABSTRACT

A process for the preparation of a spray-dried powder containing at least one glycine-N,N-diacetic acid compound of a formula MOOC—CHR—N($CH_2COOM$)$_2$, where R is a $C_{1-12}$-alkyl and M is an alkali metal, the process including: preparing an aqueous solution containing the glycine-N,N-diacetic acid compound; concurrently passing the aqueous solution and air into a spray-drying apparatus; atomizing the aqueous solution by feeding the aqueous solution onto a rotating disk or by compressing the aqueous solution with a pump to a pressure of ≥20 bar absolute, to obtain fine liquid droplets; and drying the droplets, to obtain the spray-dried powder, where a temperature gradient between the aqueous solution and the air is in a range from 70 to 350° C., and a content of the glycine-N,N-diacetic acid compound in the aqueous solution is ≥84% by weight, based on a total weight of the dry mass.

14 Claims, No Drawings

PROCESS FOR THE PREPARATION OF A SPRAY POWDER COMPRISING ONE OR MORE GLYCINE-N,N-DIACETIC ACID DERIVATIVES AND USE OF THE SPRAY POWDER FOR PRODUCING COMPRESSION AGGLOMERATES

This application is a 371 of PCT/EP10/56855 filed May 19, 2010, and claims benefit of U.S. provisional application Ser. No. 61/253,911, filed Oct. 22, 2009. Priority to European patent application No. 09160717.6, filed May 20, 2009, is claimed.

The invention relates to a process for the preparation of a spray powder comprising one or more glycine-N,N-diacetic acid derivatives, to a use of the spray powder for producing compression agglomerates, and to a use of the compression agglomerates for use in solid or liquid cleaning compositions, in particular for producing tablets for dishwashers.

Solid or liquid formulations can be selected for producing detergents, in particular textile detergents, or cleaning compositions, in particular dishwashing compositions.

Detergents or cleaners generally comprise complexing agents for iodoalkali and heavy metal ions. Glycine-N,N-diacetic acid derivatives are often used as such.

These are used in the form of spray powders which, starting from aqueous solutions which originate from the synthesis, are obtained by spray-drying. The spray powders have to have the highest possible bulk density, often in the range from about 0.3 to 0.7 kg/l, and have to have a residual moisture in a relatively narrow concentration range from about 4 to 8% water in order to be storable and to be suitable for the subsequent process step, processing to give compression agglomerates. Spray powders with a higher water content would clump too quickly, whereas spray powders with too low a water content are difficult to process.

Moreover, spray powders should be readily pourable.

It is known that spray powders form various particle forms, in particular hollow spheres, which, depending on the wall thickness, may also be broken, solid spheres or needles.

Hollow spheres, as well as solid spheres, are particularly readily pourable, have a desired high bulk density in the range from about 0.5 to 0.7 kg/l and, particularly also as hollow sphere breakage, are ideally suitable for compaction. Although needles are likewise suitable for compaction, they pour with difficulty and have a low bulk density in the range from about 0.2 to 0.5 kg/l. Although solid spheres have a high bulk density and pour easily, they are unsuitable for compaction.

The spray powders comprising complexing agents, in particular glycine-N,N-diacetic acid derivatives, either alone or with the admixture of polyethylene glycols, are often compressed in a fraction of from about 2 to 10%, between two rolls or punches, subsequently comminuted and fractionated, to give compression agglomerates.

The compression agglomerates often have to have a pregiven particle size, in particular in the range from about 0.3 to 1.6 mm, and accordingly average particle sizes in the range from about 0.6 to 0.7 mm so that similar particle size is ensured for all feed materials in a further process step, compression to give tablets for dishwashers. This is necessary for good miscibility of all feed materials, and in particular to prevent separation of same during the production of tablets for dishwashers.

It was an object of the invention to provide a process according to which spray powders which meet the above requirements can be obtained on an industrial scale.

The solution consists in a process for the preparation of a spray powder comprising one or more glycine-N,N-diacetic acid derivatives of the general formula (I)

$$MOOC—CHR—N(CH_2COOM)_2 \quad (I),$$

with the meaning

R is $C_{1-12}$-alkyl and

M is alkali metal, starting from an aqueous solution comprising the one or more glycine-N,N-diacetic acid derivatives which is spray-dried with the introduction of air, wherein the aqueous solution comprises the one or more glycine-N,N-diacetic acid derivatives in a fraction of ≥84% by weight, based on the total weight of the dry mass, and the spray-drying takes place in a drying apparatus to which the aqueous solution and the air are passed cocurrently, with a temperature gradient between the aqueous solution and the air in the range from 70 to 350° C., and in the drying apparatus the aqueous solution is atomized into fine liquid droplets by feeding it onto one or more disks which rotate at a peripheral speed of ≥100 m/s, or by bringing it by means of a pump to a pressure of ≥20 bar absolute and, at this pressure, feeding it into the drying apparatus via one or more jets.

It has been found that spray powders comprising one or more glycine-N,N-diacetic acid derivatives can be obtained which not only have excellent properties with regard to bulk density, pourability and storage stability, but which can also, moreover, be compacted in an exceptional manner to give compression agglomerates having the required high tensile strengths and/or low abrasion.

Surprisingly, it has been found that the tensile strength of compression agglomerates improves greatly if spray powders are used for this which, as proposed by the inventors, start from aqueous solutions which comprise the one or more glycine-N,N-diacetic acid derivatives in high purity and thus with a low fraction of secondary components from the synthesis, starting from aqueous solutions which comprise the one or more glycine-N,N-diacetic acid derivatives in a fraction of ≥84% by weight, based on the total weight of the dry mass.

Of suitability for this purpose are in particular glycine-N,N-diacetic acid derivatives which have been obtained by the process in DE-A 43 19 935, by reacting corresponding 2-alkyl- or 2-alkenylglycines or 2-alkyl- or 2-alkenylglycine nitriles or double glycines of the formula

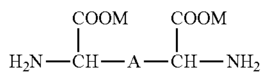

or double glycine nitriles of the formula

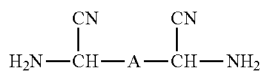

with formaldehyde and hydrogen cyanide or alkali metal cyanide or iminodiacetic acid or iminodiacetonitrile with corresponding monoaldehydes or dialdehydes of the formula OHC-A-CHO and hydrogen cyanide or alkali metal cyanide, and then hydrolyzing any nitrile groups still present to give carboxyl groups.

Moreover, the process according to the invention is carried out in drying apparatuses which are preferably operated such that a spray powder is obtained which has a high fraction of hollow spheres and/or hollow sphere breakage.

This is achieved by severe drying by ensuring a drastic operating temperature gradient between the aqueous solution, which is spray-dried, and the hot air used for this purpose and by carrying out the drying in a drying apparatus which has devices which distribute the aqueous solution to be spray-dried into very fine droplets with a droplet size in the range from about 20 to 100 μm.

The required operating temperature gradient is achieved by passing the aqueous solution and the air used for the drying to the drying apparatus with a temperature difference in the range from about 70 to 350° C., preferably in the range from about 150 to 250° C.

In particular, the aqueous solution is passed to the drying apparatus at a temperature in the range from about 20 to 120° C. and the air used for the drying is passed to the drying apparatus at a temperature in the range from about 150 to 250° C.

Preference is given to using an aqueous solution which comprises the one or more glycine-N,N-diacetic acid derivatives in a total concentration of from 20 to 60%, based on the total weight of the aqueous solution.

The required fine atomization of the aqueous solution can be achieved by placing it onto one or more rapidly rotating disks at a peripheral speed of a ≥100 m/s. This is achieved in so-called disk dryers which are operated at a corresponding rotational speed of the disks.

It is also possible to achieve the required very fine atomization of the aqueous solution by bringing it, by means of a pump, to a pressure which is a ≥20 bar absolute and, at this pressure, passing it to one or more jets which are arranged in the drying apparatus. Preferably, a membrane pump can be used for this purpose.

Preferably, the aqueous solution is brought to a pressure of ≥30 bar absolute.

The aqueous solution brought to an increased pressure can be passed to one to 30 jets, in particular one to 20 jets, where each jet has an opening preferably in the range from 1 to 4 mm.

Atomization of the aqueous solution brought to high pressures takes place in jet dryers which are known to the person skilled in the art, for example from Masters: Spray Drying Handbook.

In the process according to the invention, a spray powder is provided which comprises one or more glycine-N,N-diacetic acid derivatives of the general formula (I):

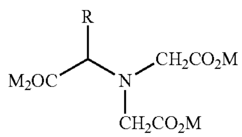

(I)

in which

R is $C_1$-$C_{12}$-alkyl and

M is alkali metal.

In the compounds of the general formula (I), M is an alkali metal, preferably sodium or potassium, particularly preferably sodium.

R is a $C_{1-12}$-alkyl radical, preferably a $C_{1-6}$-alkyl radical, particularly preferably a methyl or ethyl radical. Particular preference is given to using an alkali metal salt of methylglycinediacetic acid (MGDA) as component (a). Very particular preference is given to using the trisodium salt of methylglycinediacetic acid.

The one or more glycine-N,N-diacetic acid derivatives are used as aqueous solution, preferably with a concentration of from 20 to 60% by weight, based on the total weight of the solution.

Preferably, a spray powder with a fraction of hollow spheres and/or hollow sphere breakage of in total ≥60% is obtained, this being determined by the following method: disperse a sample of the spray powder in a silicone oil, prepare a transmitted light print with an approximately 56 to 300-times magnification and count out the particles which are present as hollow spheres and/or hollow sphere breakage and also the totality of the particles of the transmitted light print and calculate the percentage fraction of the particles which are present as hollow spheres and/or hollow sphere breakage, based on the totality of the particles.

Preferably, a spray powder with a fraction of hollow spheres and hollow sphere breakage of in total ≥80% is obtained by the process according to the invention.

The invention also provides the use of the spray powder obtained by the process described above for producing compression agglomerates by compressing the spray powder, if appropriate together with further components, in particular polyethylene glycols, preferably in a fraction between 2 and 10% by weight, and/or further additives, between two rolls or punches, subsequent comminution and fractionation. The compression agglomerates obtained here have high tensile strengths and correspondingly low abrasion.

The tensile strengths were determined by the following method:

Cylindrical compacts with a diameter of 12 mm and a height of 4 mm were produced at a compacting pressure of 200 MPas and the breaking force was measured on a tablet tester WHT II® from Pharmatest/Hainburg. The values for the breaking force (BF), the height (H) and the diameter (D) of the compact were used to determine the tensile strength (TS) according to the following formula:

$$TS = BF \times 2/(D \times H \times \pi)$$

Using the spray powders prepared by the process according to the invention, tensile strengths of ≥1.45 MPas were achieved.

These tensile strengths correspond to low values for the abrasion in the order of magnitude of <5%. The abrasion was determined by presieving a sample of comminuted and fractionated material, in particular from a compact with a particle size between 0.3 and 1.6 mm, at 500 μm for 2 min, and weighing the sieve residue. This sample was then stressed for 10 min on a vibration sieve at 2 mm amplitude and the sievings which passed through were determined. This passage is presently referred to as abrasion.

The invention also provides the use of the compression agglomerates, obtained using a spray powder prepared by the process according to the invention in solid or liquid detergents or cleaning compositions, in particular for producing tablets for dishwashers.

The invention is illustrated in more detail below by reference to working examples.

WORKING EXAMPLE 1 (FOR COMPARISON)

The starting material used was an aqueous starting solution of 39.4% by weight of the trisodium salt of methylglycine-N,N-diacetic acid (MGDA) or 81.5% by weight of MGDA, based on the total weight of the dry mass of the aqueous starting solution. A spray powder with a residual content of 6.5% by weight of water and a hollow sphere fraction of ca. 15% was produced from this in an industrial spray tower. This powder was then compressed with the addition of 7% by weight of polyethylene glycol.

A compression agglomerate (compact) was obtained with a tensile strength (TS), determined by the method given above, of 0.77 MPas.

WORKING EXAMPLE 2 (ACCORDING TO THE INVENTION)

The starting material used was an aqueous starting solution of 39.8% by weight of MGDA, or 84.8% of MGDA, based on the total weight of the dry mass.

A spray powder which had a residual moisture of 6.0% and a hollow sphere fraction of ca. 85% was produced from this in an industrial disk tower at 12 900 rpm. This was compressed, as described e.g. in example 1, with polyethylene glycol.

Compression agglomerates (compacts) were obtained with a tensile strength of 1.99 MPas.

WORKING EXAMPLE 3 (ACCORDING TO THE INVENTION)

The starting material was an aqueous starting solution of 39.9% by weight of MGDA, or 87.1% by weight of MGDA, based on the total weight of the dry mass.

A spray powder which had a residual moisture of 0.5% and a hollow sphere fraction of ca. 10% was produced from this in an industrial spray tower.

The compression agglomerate (compact) had a tensile strength of 1.9 MPas.

The examples above thus clearly demonstrate improved tensile strengths for compression agglomerates which have been obtained starting from aqueous solutions which comprise the MGDA in high purity, of ≥84% by weight, based on the total weight of the dry mass.

The invention claimed is:

1. A process for the preparation of a spray-dried powder comprising at least one glycine-N,N-diacetic acid compound of formula (I)

$$MOOC—CHR—N(CH_2COOM)_2 \quad (I),$$

wherein R is a $C_{1-12}$-alkyl and M is an alkali metal, the process comprising:

concurrently passing air and an aqueous solution comprising the at least one glycine-N,N-diacetic acid compound into a spray-drying apparatus;

atomizing the aqueous solution in the spray-drying apparatus, to obtain fine liquid droplets; and drying the fine liquid droplets, to obtain the spray-dried powder, wherein a temperature difference between the aqueous solution and the air is in a range from 70 to 350° C., wherein the atomization comprises feeding the aqueous solution onto at least one disk which rotates at a peripheral speed of ≥100 m/s, or compressing the aqueous solution with a pump to a pressure of ≥20 bar absolute and feeding the aqueous solution into the spray-drying apparatus via at least one jet, wherein a content of the at least one glycine-N,N-diacetic acid compound in the aqueous solution passed into the spray-drying apparatus is ≥84% by weight, based on a total weight of the dry mass, wherein the spray-dried powder has a fraction of hollow spheres or hollow sphere breakage of ≥60%, wherein the fraction is determined by a process comprising:

dispersing a sample of the spray-dried powder in a silicone oil, to obtain a sample mixture;

transmitting light through the sample mixture, to obtain a transmitted light print having 56 to 300-times magnification;

counting any particle present as a hollow sphere or a hollow sphere breakage and a totality of the particles in the transmitted light print; and calculating a percentage fraction of the particles present as hollow spheres or hollow sphere breakage, based on the totality of the particles, and wherein the spray-dried powder, when subjected to compression agglomeration, produces a tensile strength of ≥1.45 MPas.

2. The process of claim 1, wherein the spray-drying apparatus is a disk dryer.

3. The process of claim 1, wherein the spray-drying apparatus is a spray dryer.

4. The process of claim 1, wherein the glycine-N,N-diacetic acid compound is at least one alkali metal salt of methylglycinediacetic acid.

5. The process of claim 4, wherein the spray-drying apparatus is a disk dryer.

6. The process of claim 4, wherein the spray-drying apparatus is a spray dryer.

7. The process of claim 1, wherein the aqueous solution comprises the at least one glycine-N,N-diacetic acid compound in a total concentration of from 20 to 60% by weight, based on the total weight of the aqueous solution.

8. The process of claim 1, wherein, during the passing, the aqueous solution has a temperature of from 20 to 120° C. and the air has a temperature of from 150 to 250° C.

9. The process of claim 8, wherein the aqueous solution comprises the at least one glycine-N,N-diacetic acid compound in a total concentration of from 20 to 60%, based on the total weight of the aqueous solution.

10. The process of claim 1, wherein the atomization comprises compressing the aqueous solution with a pump to a pressure of ≥20 bar absolute and feeding the aqueous solution into the spray-drying apparatus via at least one jet, and the pump is a membrane pump.

11. The process of claim 1, wherein the atomization comprises compressing the aqueous solution with a pump and feeding the aqueous solution into the spray-drying apparatus via at least one jet, and, during the compressing, the aqueous solution has a pressure of ≥30 bar absolute.

12. The process of claim 1, wherein the atomization comprises feeding the aqueous solution onto at least one disk which rotates at a peripheral speed of ≥100 m/s.

13. The process of claim 1, wherein the atomization comprises compressing the aqueous solution with a pump to a pressure of ≥20 bar absolute and feeding the aqueous solution into the spray-drying apparatus via at least one jet.

14. The process of claim 1, wherein the spray-dried powder has a fraction of hollow spheres or hollow sphere breakage of ≥80%.

* * * * *